United States Patent
Jorge et al.

(10) Patent No.: US 8,097,547 B2
(45) Date of Patent: *Jan. 17, 2012

(54) SINTERED REFACTORY MATERIAL BASED ON SILICON CARBIDE WITH A SILICON NITRIDE BINDER

(75) Inventors: Eric Jorge, Les Valayans (FR); Olivier Marguin, Caumont sur Durance (FR); Lionel Moitrier, Mallemort (FR); Olivier Citti, Wellesley, MA (US)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 469 days.

This patent is subject to a terminal disclaimer.

(21) Appl. No.: 12/028,202

(22) Filed: Feb. 8, 2008

(65) Prior Publication Data

US 2008/0234122 A1 Sep. 25, 2008

Related U.S. Application Data

(63) Continuation-in-part of application No. 11/791,653, filed as application No. PCT/FR2005/002936 on Nov. 25, 2005.

(30) Foreign Application Priority Data

Nov. 29, 2004 (FR) .................................... 04 12627

(51) Int. Cl.
*C04B 35/567* (2006.01)
*C04B 35/586* (2006.01)

(52) U.S. Cl. ..... 501/92; 501/96.3; 501/97.4; 204/243.1; 264/647; 264/682

(58) Field of Classification Search ............ 501/92, 501/96.3, 97.4; 204/243.1–245.7; 264/647, 264/682

See application file for complete search history.

(56) References Cited

U.S. PATENT DOCUMENTS

| | | | | |
|---|---|---|---|---|
| 3,960,577 | A | * | 6/1976 | Prochazka ............... 252/504 |
| 3,968,194 | A | * | 7/1976 | Prochazka ............... 264/122 |
| 6,143,239 | A | | 11/2000 | Sonntag |
| 7,494,949 | B2 | * | 2/2009 | Kinoshita et al. ........... 501/92 |
| 2005/0008878 | A1 | | 1/2005 | Bryden |
| 2006/0281625 | A1 | * | 12/2006 | Kinoshita et al. ........... 501/92 |
| 2007/0264576 | A1 | | 11/2007 | Jorge et al. |
| 2009/0312173 | A1 | * | 12/2009 | Levoy et al. ............... 501/91 |

FOREIGN PATENT DOCUMENTS

| | | |
|---|---|---|
| CN | 1472174 A | 2/2004 |
| EP | 0 417 292 B1 | 3/1991 |
| SU | 975686 * | 11/1982 |
| WO | WO 2006/056698 A2 | 6/2006 |

OTHER PUBLICATIONS

Derwent abstract of JP 58091070, May 1983.*
Notification of the Second Office Action dated Mar. 1, 2010.
International Search Report, dated Jun. 5, 2009.

* cited by examiner

*Primary Examiner* — Karl Group
(74) *Attorney, Agent, or Firm* — Young & Thompson (57) ABSTRACT

A sintered material based on silicon carbide (SiC) reactively sintered between 1,100° C. and 1,700° C. to form a silicon nitride binder ($Si_3N_4$), intended in particular for fabricating an aluminum electrolysis cell, including 0.05% to 1.5% of boron, the $Si_3N_4$/SiC weight ratio being in the range 0.05 to 0.45.

34 Claims, 1 Drawing Sheet

SINTERED REFRACTORY MATERIAL BASED ON SILICON CARBIDE WITH A SILICON NITRIDE BINDER

CROSS REFERENCE TO RELATED APPLICATION

This application is a continuation-in-part of U.S. application Ser. No. 11/791,653 filed on May 25, 2007 as the USC 371 national stage of international application PCT/FR2005/002936 filed on Nov. 25, 2005, which designated the United States of America and claimed priority to French application No. 0412627 filed on Nov. 29, 2004. The entire contents of each of these applications is hereby expressly incorporated by reference.

FIELD OF THE INVENTION

The invention relates to novel sintered refractory blocks, especially for the construction of aluminum electrolysis cells, to a method of manufacturing them, and to a cell comprising said blocks.

Figure 1:
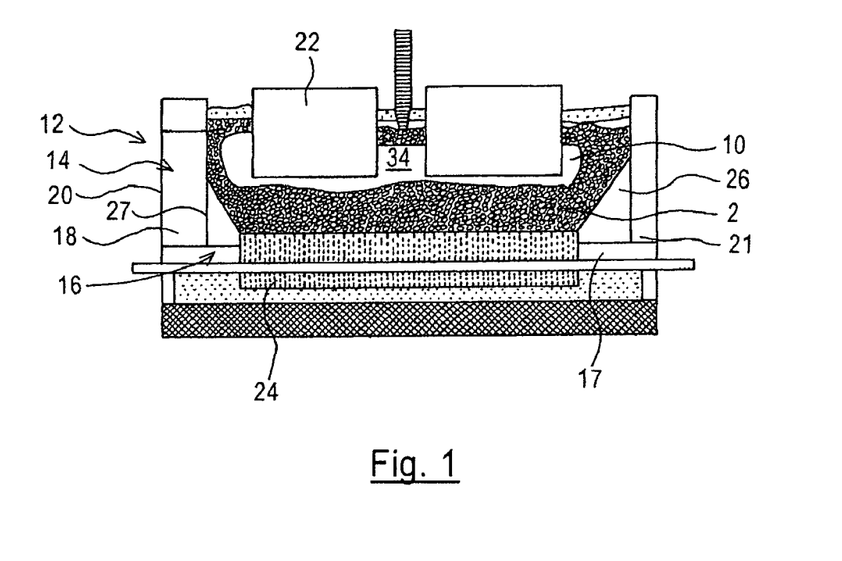
FIG. 1 is a diagrammatic representation of an electrolysis cell in cross section along a substantially medial plane.

As can be seen in FIG. 1, aluminum metal 2 may be produced on an industrial scale by electrolyzing alumina in solution in a bath 10 based on molten cryolite. The electrolyte bath 10 is conventionally contained in an electrolysis cell 12. The cell 12 comprises a side wall 14 and a bottom 16. The bottom 16 is composed of refractory bottom blocks 17 and cathode blocks 24 and insulating blocks in the lower portion. The side wall 14 is formed from refractory side blocks 18 surrounded by a metal casing 20.

The dimensions of a refractory side block 18 can vary. They are conventionally more than 30×100×100 mm [millimeter] and may attain 120×300×300 mm.

The composition of the blocks 18 may be based on carbon (graphite and/or anthracite). Typically, the mortar for the blocks 18 is a refractory cement 21 disposed between them and against the metal envelope 20. The cell 12 comprises at least one anode 22 and at least one cathode 24. The anodes 22 and cathodes 24 are disposed so as to be in contact with the molten metal bath, the cathode 24 conventionally being disposed close to the bottom 16.

When the electrodes 22 and 24 are placed under voltage, an electrolysis reaction occurs in the bath 10, resulting in the formation of a bath of aluminum in the cell, which bath is deposited on the cathode.

Passing high electric current through the bath 10 also causes heat to be released under the Joule effect. Evacuating that heat through the wall 14 of the cell 12 causes a layer 26 of solidified cryolite to be deposited on the inner surface 27 of the blocks 18. That layer is termed a "self-lining" layer.

The blocks 18 must protect the metal envelope 20 and allow sufficient heat to be evacuated to ensure temperature stabilization of the molten bath 10. In particular, it is vital to avoid reaching temperatures beyond which the self-lining layer 26 of solidified cryolite liquefies again and could contribute to very rapid corrosion of the sides of the cell. Further, the blocks 18 are often exposed to corrosive environments (very hot liquid metal, molten cryolite in the lower portion, corrosive gas in the upper portion), and they are subjected to high temperatures and large thermal and mechanical stresses.

To meet those challenges, blocks are known that are based on silicon carbide granulates which have generally satisfactory resistance to attack. Conventionally, silicon carbide granulates are sintered at a temperature in the range 1600° C. to about 2000° C. Sintering fine grained silicon carbide granulates at very high temperatures (2150° C.) is also known, enabling boron and carbon to be added. However, silicon carbide is very difficult to sinter and/or its cost is prohibitive. Further, the format of the sintered silicon carbide blocks is limited, especially due to a great deal of shrinkage on firing.

Blocks based on dense sintered silicon carbide granulates are also known, with less than 1% of $B_4C$ and C, for example Hexolloy SiC®. However, they are currently extremely expensive.

Finally, blocks based on silicon carbide (SiC) are known, bound by a matrix of silicon nitride ($Si_3N_4$). The materials for such blocks were developed at the end of the 1970s and are described, for example, in U.S. Pat. No. 2,752,258. They improve the compromise between oxidation resistance, mechanical strength (erosion), and thermal conductivity compared with carbon blocks. The improvement in abrasion resistance is particularly advantageous at the bottom of the cell where the bath, which moves under the effect of magnetic fields, may cause a great deal of abrasion.

Said blocks are obtained by reactive sintering of a mixture of silicon carbide and silicon, with nitrogen deriving from firing in a nitrogen atmosphere.

To gain useful volume and facilitate heat evacuation, research has been concentrated on reducing the thickness of such blocks. However, the thickness cannot be reduced without affecting the service life of the cells. Thus, it must be accompanied by an improvement in the oxidation resistance and resistance to attack by the cryolite bath. That need is greater if the stresses on the refractory blocks are higher. In particular, electrolysis cells are now used with a current of more than 200,000 amps and from which, as a result, a great deal of heat must be evacuated, large quantities of oxidizing gas are generated, and the self-lining layer may become unstable.

Thus, there is a need for a novel refractory block based on silicon carbide (SiC) with a nitride binder ($Si_3N_4$) that can effectively and durably resist the thermal and/or chemical stresses that may be produced in an aluminum electrolysis cell, in particular in the side wall thereof.

The invention aims to answer this need.

SUMMARY OF THE INVENTION

According to the invention, this aim is achieved by means of a sintered refractory block based on silicon carbide (SiC) with a silicon nitride ($Si_3N_4$) binder, in particular intended for fabricating an aluminum electrolysis cell, which block is remarkable in that it includes, as a percentage by weight, a total calcium and boron content in the range 0.05% to 1.5%, preferably 1.2%. Preferably, it includes at least 0.05%, preferably at least 0.3%, and more preferably at least 0.5% of boron, and/or in the range 0.05% to 1.2% of calcium.

Surprisingly, the inventors have discovered that the presence of boron and/or calcium provides a substantial improvement in properties as regards aluminum electrolysis cell applications, in particular resistance to oxidation and to attack by the cryolite bath, and dimensional stability under oxidation conditions.

The refractory block of the invention also exhibits one or more of the following preferred characteristics:
  the refractory block includes less than 3% of boron, as a percentage by weight;
  silicon nitride ($Si_3N_4$) in the beta form represents, as a percentage by weight, at least 40%, preferably at least 60%, and more preferably at least 80%, of all of the silicon nitride ($Si_3N_4$) in the beta form and in the alpha form;

the $Si_2ON_2$ content, as a percentage by weight, is less than 5%, preferably less than 2%;

the porosity of the sintered block is preferably 10% or more; and the boron is not in the $TiB_2$ form, as that form of titanium is not stable in contact with molten cryolite, in an oxidizing atmosphere. Further, $TiB_2$ is also unstable towards aluminum.

Preferably again, the $Si_3N_4$/SiC weight ratio is in the range 5% to 45%, preferably in the range 10% to 20%, i.e. in the range 0.05 to 0.45, preferably in the range 0.1 to 0.2.

Preferably, the $Si_3N_4$/SiC ratio is less than 0.3 and/or more than 0.05. Further, the $Si_3N_4$ content is preferably 11% or more, as a percentage by weight.

The invention also provides an electrolysis cell including a side wall comprising a plurality of refractory blocks, at least one of said blocks being in accordance with the invention. Preferably, all of the blocks forming the side wall of the cell of the invention are in accordance with the invention.

Finally, the invention provides a method of fabricating a refractory block in accordance with the invention, comprising the following steps in succession:

a) preparing a charge comprising a particulate mixture comprising a silicon carbide granulate and at least one boron and/or calcium compound, a binder optionally being added to said particulate mixture;

b) forming said charge in a mold;

c) compacting said charge in the mold to form a preform;

d) unmolding said preform;

e) drying said preform, preferably in air or a moisture-controlled atmosphere; and f) firing said preform in a reducing atmosphere of nitrogen at a temperature in the range 1100° C. to 1700° C.

The inventors have discovered that adding boron and/or calcium to the formulations improves the properties of sintered silicon carbide (SiC) based refractory blocks with a silicon nitride binder ($Si_3N_4$) which are obtained. In particular, the resistance to corrosion by fluorine-containing products and molten cryolite is improved.

The method of the invention also has one or more of the following preferred characteristics:

said boron and/or calcium compound contains boron;

said boron and/or calcium compound is added in a predetermined quantity so that the refractory block obtained at the end of step f) is in accordance with the invention, in particular so that it comprises, as a percentage by weight, at least 0.05%, preferably at least 0.3%, more preferably at least 0.5% of boron, and/or less than 3% of boron;

said boron and/or calcium compound is free of oxygen, i.e. added in a "non-oxide form";

said boron compound is selected from the group formed by oxides, carbides, nitrides, fluorides and metal alloys containing boron, in particular $B_4C$, $CaB_6$, $H_3BO_3$, and BN, preferably from the group formed by $B_4C$ and $CaB_6$. More preferably, said boron compound is $CaB_6$;

said calcium compound is selected from the group formed by oxides, carbides, nitrides, fluorides and metal alloys containing calcium, preferably selected from $CaB_6$, CaSi, $CaSiO_3$, and $CaCO_3$;

said calcium compound is added in a predetermined quantity such that the calcium content of the refractory block obtained at the end of step f) is in the range 0.05% to 1.2%, as a percentage by weight.

BRIEF DESCRIPTION OF THE DRAWINGS

Other characteristics and advantages of the present invention become apparent from the following description, made with reference to the accompanying drawings in which.

DETAILED DESCRIPTION OF THE INVENTION

Unless otherwise indicated, all of the percentages in the present description are percentages by weight.

When a granulate is said to be "based on" a constituent, this means that said granulate comprises more than 50% by weight of that constituent.

Known methods of fabricating refractory blocks may be employed to fabricate a block in accordance with the invention, provided that at least one oxygen-free boron compound is added to the starting charge.

Preferably, the method employed comprises the following steps:

a) preparing a charge comprising a particulate mixture comprising a silicon carbide granulate and at least one boron and/or calcium compound, a binder being added to said particulate mixture;

b) forming said charge in a mold;

c) compacting said charge in the mold to form a preform;

d) unmolding said preform;

e) drying said preform, preferably in air or a moisture-controlled atmosphere, using conventional preform fabrication procedures; and f) firing said preform in a reducing atmosphere of nitrogen at a temperature of 1100° C. to 1700° C., and drying.

In step a), the particulate mixture preferably comprises, as a percentage by weight, 30% to 90% of refractory grains wherein at least 90% have a size in the range 50 μm [micrometer] to 5 mm [millimeter], and 10% to 60% of at least one refractory powder wherein at least 90% of the particles have a diameter of less than 200 μm. Advantageously, said granulometric distribution can endow the fabricated block with optimum cohesion.

The boron may be supplied in a particulate form or in any other form provided that the maximum moisture content of the mixture remains below 7%, preferably below 5%.

The function of the binder is to form with the particulate mixture a mass that is sufficiently rigid to preserve its shape until step e). The choice of binder depends on the desired shape. Because of the binder, the mass may advantageously take the form of a layer of varying thickness, which can follow the wall of the mold, to form blocks.

Any known binder or mixture of known binders may be used. The binders are preferably "temporary", i.e. they are completely or partially eliminated during the block drying and firing steps. More preferably, at least one of the temporary binders is a solution of modified starch derivatives, an aqueous solution of dextrin or of lignone derivatives, a solution of a processing agent such as polyvinyl alcohol, a phenol resin or another epoxy type resin, a furfuryl alcohol, or a mixture thereof. More preferably, the quantity of temporary binder is in the range 0.5% to 7% by weight relative to the particulate mixture of the charge.

Pressing additives as are conventionally used in fabricating sintered blocks may be added to the particulate mixture and the binder. Said additives comprise plasticizers, for example modified starches or polyethylene glycols and lubricants, for example soluble oils or stearate derivatives. The quantities of such additives are those conventionally used when fabricating sintered silicon carbide (SiC) based refractory blocks with a silicon nitride binder ($Si_3N_4$).

Mixing of the charge is continued until a substantially homogeneous mass is obtained.

In step b), the charge is shaped and placed in a mold.

In the next compaction or "pressing" step c), the contents of the mold are compressed by applying a force to the upper surface of the charge which can transform it into a preform that is capable of being sintered. A specific pressure of 300 $kg/cm^2$ [kilogram/square centimeter] to 600 $kg/cm^2$ is appropriate. Pressing is preferably carried out uniaxially or isostatically, for example using a hydraulic press. It may advantageously be preceded by a manual or pneumatic and/or vibrational ramming operation.

Next, the preform is unmolded (step d)), then dried (step e)). Drying can be carried out at a moderately high temperature. Preferably, it is carried out at a temperature in the range 110° C. to 200° C. It conventionally lasts between 10 hours and one week, depending on the format of the preform, until the residual moisture content of the preform is less than 0.5%.

The dried preform is then fired (step f)). The firing period, between about 3 and 15 days cold to cold, depends on the materials and also on the size and shape of the block. In accordance with the invention, firing is carried out in nitrogen in order to form the nitride by reactive sintering, which nitride acts as the ceramic binder for the grains. The firing cycle is preferably carried out at a temperature in the range 1100° C. to 1700° C. During firing, nitrogen reacts with certain of the constituents of the particulate mixture of the charge to form a matrix of silicon nitride which can bind the grains of said charge, in particular grains of silicon carbide. A monolithic block is produced.

In the various tests below, provided by way of non-limiting illustration, the particle size of the powders used as additives ($B_4C$, $CaB_6$, and $CaSiO_3$) is less than 45 μm. Their respective contents in the starting composition are indicated in Table 1.

Metallic silicon is also added in the proportion indicated in Table 1.

"Black" or "refractory" silicon carbide with different granulometric fractions, sold by Saint-Gobain Ceramic Materials, was also used. This material is essentially constituted by alpha SiC and has a mean chemical analysis, by weight, of 98.5% of SiC.

Table 1 also shows the results of various tests carried out to characterize the products of the invention compared with the reference product (Refrax® type product). All of the measurements were carried out on the core of the specimens.

The nitrogen (N) contents in the products were measured using LECO (LECO TC 436 DR; LECO CS 300) type analyzers. The values given are percentages by weight.

The boron (B) and calcium (Ca) contents in the products were measured by X-ray fluorescence spectrometry. The values given are percentages by weight.

The oxidation tests were carried out in accordance with ASTM C863. To reproduce the oxidation conditions experienced by the blocks of an aluminum electrolysis cell, the specimens (typically with a size of 25×25×120 mm) underwent a test of at least 100 hours at 900° C. in an atmosphere saturated with steam. Oxidation generates an increase in mass ("Om" value, given as a percentage) and/or in volume ("Ov", given as a percentage), which results from the transformation of the silicon nitride and carbide into silica. The increases in mass and volume were thus indicators of the degree of oxidation.

Two materials were considered to be different when their oxidation indicators differed by at least 1% (mean over 3 test specimens).

The variation in open porosity due to plugging by the oxidation products of the reaction was also a measure allowing the degree of oxidation to be determined. The open porosity was measured in accordance with International Standard ISO5017 ("PO-Ox" value, given as a percentage).

The corrosion resistance test allowed the behavior of 25 mm×25 mm cross section specimens which had already undergone the oxidation test to be determined. These specimens were kept at 1030° C. for 22 hours in a bath of molten cryolite. Their corroded length was then measured, i.e. the reduction in their length resulting from corrosion. The value "Ic" provides, as a percentage, the ratio between the corroded length of the test specimen and the corroded length of a reference specimen. The lower the Ic, the better the corrosion resistance.

The crystalline phases present in the refractory products were determined by X ray diffraction. Principally, it was found that silicon nitride $Si_3N_4$ as well as an oxynitride phase, $Si_2ON_2$, were present. The amounts of these phases, as a percentage by weight, are indicated in Table 1. The complement was SiC.

The apparent specific gravity of the products of the invention was in the range 2.4 to 2.7. That of the reference product was 2.6.

The silicon nitride could be in the alpha or beta form. The alpha phase was present in the form of a tangle of silicon nitride fibrils, while the beta phase was in the form of grains with a variable shape.

Analyses carried out over several years by the Applicant have shown that silicon nitride in the beta form is less sensitive to rapid combustion because of its lower specific surface area, than is silicon nitride in the alpha form. During rapid combustion, silicon nitride is oxidized and produces silica which is "consumed" by the molten cryolite. Those reactions thus result in an increase in the porosity and connectivity of the pores, facilitating the penetration of corrosive materials. Thus, it is advantageous to encourage the formation of the beta form to improve the resistance to attack by molten cryolite.

However, it is known that enrichment of the beta silicon nitride phase is generally accompanied by an enrichment in the oxynitride phase $Si_2ON_2$.

However, silicon oxynitride, like residual silicon and Sialon with alumina impurities, conventionally generated during a nitriding process, are unwanted phases which have a lower resistance to cryolite compared with that of silicon nitride, regardless of the form of the silicon nitride. Thus, it is advantageous to limit the quantities thereof.

The inventors have discovered that adding boron and/or calcium, preferably in an oxygen-free form, to the starting charge advantageously stimulates the transformation into beta silicon nitride during the process for nitriding silicon carbides with a nitride binder, without causing deleterious enrichment of the $Si_2ON_2$ oxynitride phase. Table 1 below illustrates this discovery.

In accordance with the invention, a boron compound is thus added, preferably in a non-oxide form. Advantageously, this addition results in almost complete transformation into beta silicon nitride without major enrichment of the oxynitride phase $Si_2ON_2$.

TABLE 1

| N° | Composition | | | | | Analysis | | | | | | | | | | | |
|---|---|---|---|---|---|---|---|---|---|---|---|---|---|---|---|---|---|
| | Si | $B_4C$ | $CaB_6$ | $H_3BO_3$ | $CaCO_3$ | PO | N | B | Ca | $Si_3N_4$ a | $Si_3N_4$ b | b/a | $Si_2ON_2$ | Om | Ov | PO—Ox | Ic |
| R | 13.5 | 0 | 0 | 0 | 0 | 17.2 | 5.9 | 0.0 | 0.1 | 12 | 5 | 29 | 3 | 1.6 | 1.0 | 14.0 | 100 |
| 1 | 13.5 | 0.2 | 0.0 | 0.0 | 0.0 | 16.2 | 6.4 | 0.1 | 0.1 | 10 | 9 | 47 | 3 | 2.4 | 0.0 | 9.4 | 45 |
| 2 | 11.8 | 0.5 | 0.0 | 0.0 | 0.0 | 17.1 | 7.4 | 0.5 | 0.1 | 8 | 9 | 53 | 3 | 2.7 | 0.1 | 9.5 | ND |
| 3 | 13.5 | 0.5 | 0.0 | 0.0 | 0.0 | 15.5 | 6.1 | 0.4 | 0.2 | ND | ND | ND | ND | 1.3 | 0.0 | 8.6 | 65 |
| 4 | 10.0 | 0.8 | 0.0 | 0.0 | 0.0 | 16.8 | 5.5 | 0.6 | 0.1 | 7 | 7 | 50 | ND | 2.5 | 0.0 | 6.7 | 61 |
| 5 | 13.5 | 0.8 | 0.0 | 0.0 | 0.9 | 16.3 | 7.1 | 0.5 | 0.4 | 1 | 14 | 93 | 4 | 1.5 | 0.0 | 10.0 | 41 |
| 6 | 13.5 | 0.8 | 0.0 | 0.0 | 0.0 | 16.1 | 7.0 | 0.5 | 0.0 | 2 | 14 | 88 | 4 | 1.9 | 0.1 | 9.4 | 41 |
| 7 | 13.5 | 0.8 | 0.0 | 0.0 | 0.0 | 16.1 | 7.1 | 0.6 | 0.1 | 7 | 10 | 59 | 2 | 2.4 | 0.1 | 6.2 | 45 |
| 8 | 14.3 | 0.8 | 0.0 | 0.0 | 0.0 | 16.1 | 7.0 | 0.5 | 0.0 | 1 | 14 | 93 | 4 | 2.0 | 0.1 | 9.5 | 41 |
| 9 | 13.5 | 1.0 | 0.0 | 0.0 | 0.0 | 15.2 | 6.1 | 0.6 | 0.2 | ND | ND | ND | ND | 1.5 | 0.1 | 7.6 | 72 |
| 10 | 13.5 | 1.6 | 0.0 | 0.0 | 0.0 | 16.1 | 6.9 | ND | 0.2 | 2 | 17 | 89 | 0 | 2.2 | 0.2 | 7.1 | 70 |
| 11 | 14.3 | 1.6 | 0.0 | 0.0 | 0.0 | 17.0 | 7.2 | 1.0 | 0.1 | 1 | 14 | 93 | 4 | 2.3 | 0.0 | 7.3 | 70 |
| 12 | 13.5 | 3.0 | 0.0 | 0.0 | 0.0 | 13.6 | 4.5 | 1.9 | 0.2 | ND | ND | ND | ND | 1.4 | 0.0 | 8.3 | 60 |
| 13 | 14.3 | 5.0 | 0.0 | 0.0 | 0.0 | 14.1 | 8.1 | 2.9 | 0.1 | 1 | 14 | 93 | 4 | 1.7 | 0.3 | 5.1 | 73 |
| 14 | 13.5 | 0.0 | 0.0 | 3.5 | 0.0 | 20.0 | 7.1 | 0.4 | 0.1 | 2 | 9 | 82 | 7 | 1.0 | 0.0 | 13.5 | 86 |
| 15 | 13.5 | 0.0 | 0.0 | 3.5 | 0.9 | 20.0 | 7.8 | 0.4 | 0.4 | 2 | 13 | 87 | 7 | 1.4 | 0.3 | 16.4 | 88 |
| 16 | 13.5 | 0.0 | 0.0 | 0.0 | 2.0 | 19.1 | 6.7 | ND | 1.0 | 9 | 9 | 100 | 0 | 1.5 | 0.9 | ND | 75 |
| 17 | 13.5 | 0.0 | 0.2 | 0.0 | 0.0 | 16.6 | 7.3 | 0.1 | 0.2 | 8 | 10 | 56 | 2 | 1.9 | 0.2 | 10.3 | 45 |
| 18 | 13.5 | 0.0 | 0.5 | 0.0 | 0.0 | 14.3 | 5.8 | 0.3 | 0.5 | ND | ND | ND | ND | 1.0 | 0.0 | 8.3 | ND |
| 19 | 13.5 | 0.0 | 1.0 | 0.0 | 0.0 | 16.4 | 7.7 | 0.3 | 0.4 | 1 | 18 | 95 | 0 | 1.6 | 0.3 | 11.3 | 35 |
| 20 | 13.5 | 0.0 | 1.0 | 0.0 | 0.0 | 15.6 | 7.1 | 0.6 | 0.5 | 3 | 15 | 83 | 3 | 1.7 | 0.0 | 7.7 | 47 |
| 21 | 13.5 | 0.0 | 3.0 | 0.0 | 0.0 | 14.3 | 6.0 | 1.1 | 1.4 | ND | ND | ND | ND | 2.0 | 0.0 | 7.5 | ND |

Table 1 indicates that adding boron and/or calcium can improve the corrosion resistance of refractories formed from silicon carbide with a $Si_3N_4$ matrix binder.

Table 1 indicates that adding boron and/or calcium can advantageously enhance the proportion of beta phase $Si_3N_4$. However, only adding boron and/or calcium in a non oxide form can limit the amount of silicon oxynitride $Si_2ON_2$ to values close to or lower than that of the reference product, as can be seen in Examples 14 and 15.

Table 1 indicates that the open porosity is improved when the amount of boron in the final product is non zero: only examples 14, 15 and 16 have an open porosity that is greater than that of the reference product. For this reason, products containing 0.05% to 3% of boron are preferred.

Further, Table 1 shows that the presence of boron compounds in the starting charge advantageously catalyzes the nitriding reaction (the amount of nitrogen in the products of the invention is enhanced).

Without wishing to be bound by a theory, the inventors have a partial explanation for the improvement in corrosion resistance, namely stabilization of oxidation degradation. As indicated in Table 1 and shown in FIG. 2, the oxidation resistance of the products of the invention is improved.

Table 1 shows that the variation in volume due to oxidation is very limited in the products of the invention. Further, the increase in mass after oxidation is limited when the calcium that is added is combined with boron. Thus, adding $CaB_6$ is advantageous, in particular in amounts between 0.5% and 2%.

Figure 2:
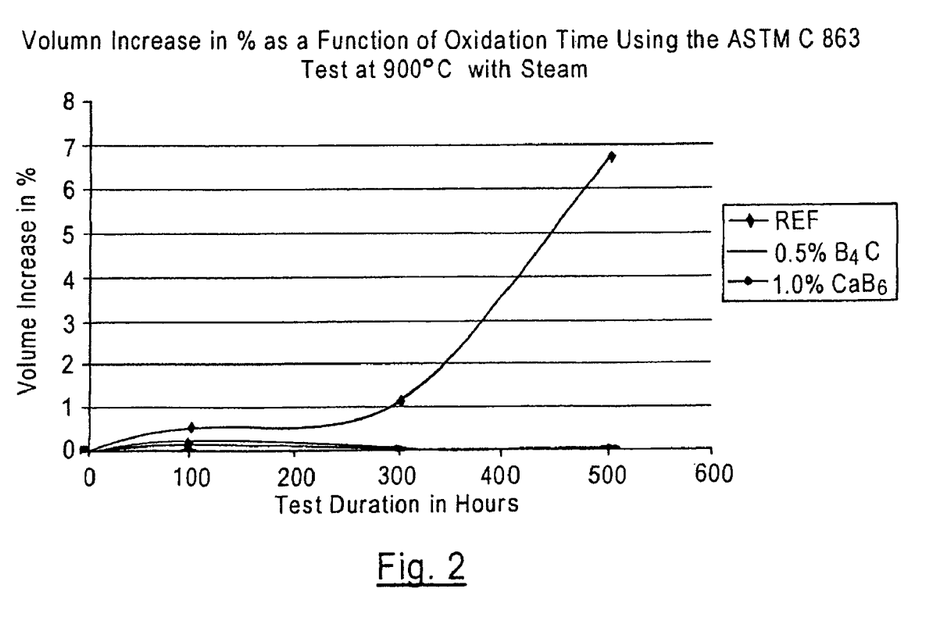
FIG. 2 represents in the form of graphs, the percentage variation in the increase in volume due to oxidation as a function of time for different blocks tested in accordance with American Standard ASTM C863 at 900° C.

FIG. 2 shows the change in the resistance to oxidation when the test is extended to 500 hours. The improvement over the reference is confirmed and accentuated.

Table 1 shows that adding boron and/or calcium has an influence on corrosion resistance even for small amounts. It also appears that a minimum amount of 0.8% by weight can produce a substantially maximum corrosion resistance.

Preferably, the percentage by weight of $CaB_6$ in the starting charge is more than 0.5%.

It appears that the effect of adding $B_4C$ to the starting charge is substantially the same at $B_4C$ contents as low as 0.2%. A reinforced effect is obtained with a content of 0.6%.

Clearly, the present invention is not limited to the implementations described and shown by way of non limiting illustrative examples.

The inventors have also observed that adding boron in the non oxide form, and more specifically $CaB_6$ or $B_4C$, also contributes to increasing the thermal diffusivity of the products of the invention, without a specific effect linked to compactness. This is clearly very important in encouraging heat transfer.

Further, it has been found that none of the products of the invention contains $Si_3N_4$ in the acicular form, including on the surface.

The oxidation performance of the products of the invention indicates that applications other than in electrolysis cells may be envisaged.

But, the inventors have discovered that the material of the refractory block of the invention which has been described here above, called "sintered material of the invention" may be used, with various forms, in quite different applications than in electrolysis cells and, in particular, in applications where it could not be predicted that this material would be appropriate.

The invention also concerns a refractory product, in the form of:
   a "shaped product", in particular in the form of a block, for instance a brick or a wall block, a plate, a tile, and a tube,
   a "non shaped product", in particular a lining comprising, or made of, a sintered material of the invention, said sintered material being manufactured on plant, for instance from a castable or a pumpable composition.

A shaped product is a product which has been given a specific shape with a mold or through a die. On the contrary, an unshaped product is a product which has been applied on a support without being shaped, for instance through a projection of a castable product. An unshaped product is sintered after being applied on the support.

The shaped product may be chosen in the group consisting of kiln furniture or of other firing supports, in particular in the form of a plate, a post, a setter, a beam or a roller, said kiln furniture being covered by a protective coating or not; a block, a tile and a tube of a heat exchanger; a block, a tile and a tube of a heat recuperator; a block, a tile and a tube of a heat regenerator; a block, a tile and a tube of a muffle; a block, a tile and a tube of a domestic incineration furnace; a block, a tile and a tube of a furnace of a glass making factory, in particular in a location where the sintered material of the invention is not in direct contact with the molten glass, a block, a tile and a tube of a metallurgical furnace, in particular a block, a tile and a tube of a holding furnace or a block of a smelting furnace for non ferrous metals, like copper shaft furnaces; a block, a tile and a tube of a protection wall, in particular to protect a heat exchanger; a block of a skid rail of a metallurgical furnace, for example a furnace for the heat treatment of iron or steel bars or of other metallurgical products; a block and a tube of an immersion heater; a heater tube, a thermocouple protective tube, and a tube for transporting molten metal.

The shaped product may have any shape, depending on the intended application.

In particular, it may be massive.

The maximal thickness of a product is usually determined so that the level of residual silicon in the core of the product be less than 1% by weight, as measured for example by X Ray diffraction. It depends on the firing technology. Preferably, the maximal thickness is less than 150 mm.

The minimal thickness of a product is mainly depending on the forming technology, the mix formulation and the desired mechanical properties.

Surprisingly, a shaped product of the invention may be thin, for instance substantially flat. Its thickness may be less than 3/10, less than 2/10, less than 1/10, less than 5/100, less than 2/100 or even less than 1/100 or less than 5/1000 of its length and/or of its width.

The invention in particular relates to a refractory product, for instance in the form of a plate, the thickness of which is less than 10 mm, less then 8 mm, or less than 5 mm. It may have a length and/or a width of 5 cm or more, 10 cm or more, 20 cm or more, 50 cm or more or even 100 cm or more. Its surface may be 1 $m^2$ or more.

Without being bound by a theory, the inventors consider that boron helps to form a stable nitrogen glassy phase that limits the increase of crystallized silica ($SiO_2$) and therefore avoids a fall of the mechanical resistance in service. A sintered material of the invention may therefore be used in the form of a thin product.

The invention also concerns a device chosen in the group constituted of a heat exchanger, an incineration furnace, in particular for domestic waste, a heat recuperative furnace, a heat recuperator, a heat regenerator, a furnace for making heat insulation fibre glass, a firing support, and in particular kiln furniture, a glass making factory, a metallurgical furnace, in particular a holding furnace or a smelting furnace, a skid rail for a metallurgical furnace, an immersion heater, an assembled wall, an assembled lining, an assembled muffle and more generally an assembly of shaped products, a non shaped lining, i.e. which does not result of an assembly of shaped products, said device comprising, and possibly being constituted of, a sintered material of the invention.

Kiln Furniture

The inventors have discovered that the sintered material of the invention has a very good mechanical resistance in a large range of temperatures, especially from 800° C. up to 1,600° C., or even up to 1,750° C. This was not expected because of the low smelting points of current oxide glassy phases containing boron.

They also discovered that the sintered material of the invention can very well withstand cyclic variations of temperature. For instance it can very well withstand more than 100 cycles between 20° C. and 1500° C. under air, each cycle lasting several hours, as it occurs in tunnel furnaces for firing porcelain articles.

They finally discovered that said sintered material presents a very high dimensional stability. In fact, kiln furniture made of the sintered material of the invention has a long service life.

Besides, as described, for example, in U.S. Pat. No. 6,143, 239 or EP 603 851, incorporated by reference, it is known that kiln furniture may be made of a support covered by a protective coating (in particular a sol or a glaze), deposited on the fired support. The coating may comprise or be made of metal hydrate, e.g. alumina hydrate, alumina, aluminosilicate, in particular mullite and its precursors, borosilicate, zircona, and mixture of these constituents.

The dilatation coefficients of the support and of the coating are determined to be as close as possible, but the difference of these dilatation coefficients usually increases with time. In addition, the support may react with the coating and swell, which may lead to peeling of the coating. The inventors have observed that supports made of a sintered material of the invention and covered with a coating such as those described in U.S. Pat. No. 6,143,239 or EP 603 851 present a very long service life, without peeling. Without being bound by this theory, they consider that this advantageous property is due to the fact that the sintered material of the invention does not react, or very little, with the coating.

Because of its noteworthy chemical inertness, the sintered material of the invention may be used, very efficiently, without any coating. Advantageously, the manufacturing and maintenance costs of kiln furniture made of a sintered material according to the invention, without being coated, would be reduced.

The invention therefore also concerns a firing method in which an item to be fired is supported by a firing support during firing, said firing support comprising a sintered material of the invention and being free of any coating, at least on the surface in contact with said item.

Besides, in some applications, the firing support is classically fired under air atmosphere, typically between 800° C. and 1,600° C. in order to passivate the support. The inventors have discovered that this operation may be omitted with a product of the invention.

Heat Recuperative Furnaces and Heat Recuperators

Heat recuperative furnaces are used for making glass, as described in the patent application U.S. Pat. No. 4,497,628, incorporated by reference. The blocks of these furnaces, and in particular the bottom blocks, are exposed to corrosive alkali vapours at about 1000-1100° C. and to strong mechanical erosion due to high air velocities and to the presence of particles or dust. Usually, the blocks used in heat recuperative furnaces for making glass are therefore oxide products.

However, surprisingly, the inventors also discovered that the sintered material of the invention has an excellent thermal stability and a good corrosion resistance in the severe conditions which occur in this application.

Muffle

The muffles covering the forming blocks described, for example, in the patent application US 2005/130830, incorporated by reference, are subjected to a strong oxidizing environment during the manufacture of glass. The inventors have discovered that the sintered material of the invention is very stable in these severe conditions. The invention therefore also concerns a muffle, and more generally, any part of a glass making factory which is not in contact with molten glass, comprising, or made of, a sintered material of the invention.

Refractory Tubes

The inventors have found that the performances of refractory tubes like heater tubes or thermocouple protective tubes or tubes for transporting molten metal, as described for example in U.S. Pat. No. 5,135,893, incorporated by reference, may be improved by a sintered material of the invention.

Incineration Furnace

Refractory linings for incineration furnaces are for example described in EP 0 107 520, WO 00/26597 or EP 0 635 678, incorporated by reference.

The inventors have discovered that a sintered material of the invention is also very well suited to make the refractory lining of an incineration furnace, in particular for the incineration of domestic waste. It may be shaped into refractory tiles or walls or tubes or bricks or the like. The sintered material of the invention indeed exhibits few cracks and a good corrosion resistance at temperatures up to 1,300° C. in the environment of such incineration furnaces.

The inventors have also discovered that the thermal conductivity is very little reduced by the corrosion by alkalis vapours. This is very advantageous in applications where the material of the invention is intended to transfer the heat by conduction. The inventors have noticed that an amount of boron of 1.5%, in percentage by weight of the sintered material according to the invention, enables a good maintenance of the thermal conductivity.

Moreover, it was also noticed by the inventors that a second firing in an oxidizing atmosphere, for example in air, of a sintered material of the invention, after the first firing in a nitrogen atmosphere (corresponding to the previously described step f)), leads to an excellent resistance against corrosion. In particular, the dimensional stability in an oxidizing atmosphere saturated with moisture is very high. Such a property was not predictable.

The second firing may be done at a temperature between 1,000° C. and 1,700° C. It would usually last between 1 and 10 hours, depending on the dimensions of the sintered product.

Fabrication Method

The invention also concerns a method of fabricating a sintered material based on silicone carbide (SiC), with a silicon nitride binder ($Si_3N_4$), said method comprising the following steps in succession:

A) preparing a charge comprising a particulate mixture comprising a silicon carbide granulate and at least one boron and/or calcium compound, a binder optionally being added to said particulate mixture;
B) forming said charge;
C) firing said formed charge in a reducing atmosphere of nitrogen at a temperature in the range 1,100° C. to 1,700° C.;

said boron and/or calcium compound being added in a quantity which is determined so that the sintered material obtained at the end of step C) includes a total amount of calcium and boron in the range 0.05% to 1.5%.

The composition of the starting charge may be determined so as to obtain, at the end of step C), a sintered material which has one or several of the optional characteristics of a sintered material according to the invention.

At step B), any technique known to form a charge to fabricate a ceramics may be used. In particular, step B) may comprise the following operations:

i) forming the charge by pressing or by casting or slip casting in a porous or non porous mold, to obtain a preform;
ii) unmolding said preform;
iii) drying.

The forming operation may comprise, for instance, an additional compacting technique by vibration or tamping In an embodiment of the invention, the forming operation at step i) may comprise extrusion.

In an embodiment of the invention, the fabrication method according to the invention comprises an additional step, following step C), in which the sintered material obtained at the end of step C) is fired in an oxidizing atmosphere, preferably at a temperature between 1,000° C. and 1,700° C., and possibly for a time in the range between 1 and 10 hours, depending on the dimensions of the mass of sintered material.

The second firing step may be done as a post-treatment, after partial or complete cooling of the sintered material obtained at the end of the first firing step.

It could also be done in the continuity of the first firing step, through the injection of an oxidizing gas, for example air, without any substantial cooling between the two firing steps. The fabrication method according to this embodiment is therefore particularly efficient.

The oxidizing atmosphere preferably contains at least 20% by weight of oxygen

EXAMPLES

The samples of the following examples A to D were shaped by slip casting in a gypsum mould to form plates.

The ceramic slip was prepared from the constituents according to Table 2. After removal from the mould, the green plates were dried at up to 100° C. and fired at 1,420° C. under nitrogen atmosphere. The green plates were thus sintered by reaction with nitrogen to form silicon nitride bond.

The samples of the examples E to H are plates, tiles or bricks which were prepared by pressing a mix inside a mould at a pressure of about 500 kg/cm$^2$ in order to obtain green compacts with the desired dimensions. The ceramic mix was prepared from the constituents according to the Table 2'.

After removal from the mould, the plates or tiles or bricks of all the examples except G were dried at up to 100° C. and fired at 1,420° C. under nitrogen atmosphere.

The product G is a brick made of sintered chromium oxide called Zirchrom 60® delivered by Saint-Gobain SEFPRO Bulk density and open porosity were measured in accordance with ISO5017 Standard.

The modulus of rupture in bending (MOR) was evaluated according to the ISO5014 Standard.

The steam oxidation test 5 was performed in accordance with ASTM C863 at 1000° C.

The corrosion test 6 for reproducing the corrosion in heat recuperative furnaces for fibre glass making was obtained in the following manner. Three cylindrical samples of 22 mm diameter and 100 mm length were cut from the core of each brick, tile or plate to be tested. The samples, placed in a furnace crucible, were immersed in a slag of rasorite (which is a kind of sodium boride) at a temperature of 1000° C. for 48 hours under air atmosphere. The samples were rotated at a speed of 6 rpm. The volume was measured before and after corrosion. The corrosion indicator is equal to the reverse of the average volume loss of the three samples of the tested brick, tile or plate. The volume loss results from the corrosive attack by the melt and the vapours. Higher is the corrosion indicator, higher is the corrosion resistance. The Zirchrom 60® is the reference product. Its corrosion indicator is therefore 100.

The thermal conductivity was measured according to test 7. First, the thermal diffusivity a (600° C.) was measured by laser flash method at 600° C. under argon in accordance with EN821.2 recommendation. The thermal conductivity lambda (600° C.) was evaluated according to the relation Lambda(600° C.)=rho*a(600° C.)*Cp(600° C.)

where rho is the bulk density measured in accordance with ISO5017 and Cp is the thermal heat capacity measured by a calorimeter.

The test results in the tables 3 and 3' show that the products B and D are much more stable in dimension after an oxidation according a very long duration compared to the reference products A and B, respectively.

It was also found that the D product of the invention exhibits a better abrasion resistance compared to the reference product C.

The product F of the invention exhibits a smaller decrease of its thermal conductivity compared to the reference product E.

The product H of the invention exhibits a really high corrosion resistance in accordance with the test 6 compared to the reference product G.

TABLE 2

|  | A According to U.S. Pat. No. 4990469 | B Product of the invention | C Reference product | D Product of the invention |
|---|---|---|---|---|
| Mix formulation (pourcentages in weight) | | | | |
| SiC grains and powder 0.2 to 1 mm |  |  | 81 | 80.2 |
| SiC Grains and powder 20 to 150 µm | 40 | 39.6 |  |  |
| SiC Grains and powder 0.1 to 10 µm | 37.5 | 37.2 |  |  |
| Silicon metal powder 0.5 to 50 µm | 17 | 16.9 | 16 | 16 |
| Calcined Refractory Clay |  |  | 3 | 3 |
| Boron carbide powder (B4C >95%) diameter of grains: 95% less than 45 µm |  | 0.8 |  | 0.8 |
| Iron oxide powder 1 to 75 µm | 0.5 | 0.5 |  |  |
| Calcined alumina powder 0.4 to 10 µm | 5 | 5 |  |  |
| Mineral formulation | 100 | 100 | 100 | 100 |
| Additives (pourcentages in weight relative to total mineral formulation) | | | | |
| Fluidizer such as water and sodium hydroxide | 0.3 | 0.3 | 0.2 | 0.2 |
| Water | 12.5 | 12.5 | 6 | 6 |

TABLE 2'

|  | E Reference product | F Product of the invention | H Product of the invention |
|---|---|---|---|
| Mix formulation (pourcentage in weight) | | | |
| SiC grains and powder 0.2 to 3 mm | 65 | 64.5 | 72 |
| SiC Grains and powder 90% <200 µm % | 21 | 20.8 | 14.5 |
| Silicon metal powder 0.5 to 75 µm | 14 | 13.9 | 13 |
| Boron carbide powder (B4C >95%) diameter of grains 95% lower than 45 µm |  | 0.8 | 0.5 |
| Iron oxide powder 1 to 75 µm |  |  |  |
| Calcined alumina powder 0.4 to 10 µm |  |  |  |
| Mineral formulation | 100 | 100 | 100 |
| Additives (pourcentages in weight relative to total mineral formulation) | | | |
| Calcium lignosulfonate binder | +2.0 | +2.0 | +2.0 |
| Cellulose binder | +0.5 | +0.5 | +0.5 |
| Water | +3.0 | +3.0 | +3.0 |

TABLE 3

|  | examples | A According to U.S. Pat. No. 4990469 | B Product of the invention | C Reference product | D Product of the invention |
|---|---|---|---|---|---|
| Shape of the product |  | 50*50*4 mm plates | 50*50*4 mm plates | 50*50*4 mm plates | 50*50*4 mm plates |
| Test 1 | Bulk density | 2.82 | 2.83 | 2.65 | 2.67 |
| Test 1 | Open porosity % | 12.0 | 12.1 | 15.0 | 15.0 |
| Test 2 | Modulus of rupture MPa at ambiant | 175 | 180 | 40 | 42 |
| Test 3 | Si3N4 α | 8 | 5 |  |  |
|  | Si3N4 β | 14 | 17 |  |  |
|  | SiAlON β' |  |  |  |  |
|  | Si2ON2 | 3 | 2 |  |  |

TABLE 3-continued

| examples | | A According to U.S. Pat. No. 4990469 | B Product of the invention | C Reference product | D Product of the invention |
|---|---|---|---|---|---|
| Test 4 | N LECO analysis | 8.5 | 8.7 | 8 | 8.2 |
| | SiC LECO analysis | 72 | 71 | 75 | 76 |
| | O LECO analysis | | | 1.5 | 1.6 |
| test 5 | Δ m/m(%) after 500 h | +3.0+ | +1.9 | | |
| | Δ v/v (%) after 500 h | +2.5 | +0.2 | +3.5 | +0.5 |

TABLE 3'

| examples | | E Reference product | F Product of the invention | G = Zirchrom 60 Reference product | H Product of the invention |
|---|---|---|---|---|---|
| Shape of the product | | Tile Dim 20*100*100 mm | Tile Dim 20*100*100 mm | bricks 75*230*230 mm | bricks 75*230*230 mm |
| Test 1 | Bulk density | 2.70 | 2.70 | 3.85 | 2.62 |
| Test 1 | Open porosity % | 14.0 | 14.0 | 14.0 | 16.5 |
| Test 2 | Modulus of rupture MPa at ambiant | 55 | 50 | | |
| test 3 | Si3N4 a | 8 | 4 | | 1 |
| | Si3N4 β | 12 | 18 | | 15 |
| | SiAlON β' | | | | |
| | Si2ON2 | <2 | <2 | | |
| Test 4 | N LECO analysis | 7.9 | 7.7 | | 8 |
| | SiC LECO analysis | 79 | 78.5 | | 78 |
| | CR2O3 chemical analysis | | | 62 | |
| | ZrO2 chemical analysis | | | 10 | |
| | O LECO analysis | 0.5 | 0.5 | | 0.9 |
| test 5 | Δ m/m (%) after 500 h | +4.0 | +1.8 | | |
| | Δ v/v (%) after 500 h | +1.6 | +0.2 | | |
| Test 6 | corrosion test with rasorite at 1000° C./48 h Corrosion index Id | | | 100 | 400 |
| Test 7 | Thermal conductivity at 600° C. in w/m · K by laser flash method | 20 | 25 | | |
| | Loss in % after steam oxidation according to test 5 but after 300 h | 8 | 18 | | |

The invention claimed is:

1. A sintered material based on silicon carbide (SiC) reactively sintered between 1,100° C. and 1,700° C. to form a silicon nitride ($Si_3N_4$) binder, including a boron compound, the boron compound being selected from the group consisting of oxides, carbides, nitrides, fluorides containing boron and $CaB_6$, a percentage by weight of boron being in a range of 0.05% to 1.5%, and a $Si_3N_4$/SiC weight ratio being in a range 0.05 to 0.45, a porosity of the sintered material being 10% or more.

2. The sintered material according to claim 1, in which the percentage by weight of boron is in the range 0.05% to 1.2%.

3. The sintered material according to claim 1, in which the $Si_3N_4$/SiC weight ratio is in the range 0.1 to 0.2.

4. The sintered material according to claim 1, in which the silicon nitride ($Si_3N_4$) in the beta form represents, as a percentage by weight, at least 40% of the whole of the silicon nitride ($Si_3N_4$) in the beta form and in the alpha form.

5. The sintered material according to claim 4, in which the silicon nitride ($Si_3N_4$) in the beta form represents, as a percentage by weight, at least 80% of the whole of the silicon nitride ($Si_3N_4$) in the beta form and in the alpha form.

6. The sintered material according claim 1, in which the amount of $Si_2ON_2$, as a percentage by weight, is less than 5%.

7. The sintered material according to claim 6, in which the amount of $Si_2ON_2$, as a percentage by weight, is less than 2%.

8. The sintered material according to claim 1, in which the $Si_3N_4$ content is 11% or more, as a percentage by weight.

9. The sintered material according to claim 1, in which the porosity is 10% or more.

10. The sintered material according to claim 1, including a mixture of boron and calcium, the total amount of calcium and boron being in the range 0.05% to 1.5%.

11. The sintered material according to claim 10, in which the percentage by weight of calcium is in the range 0.05% to 1.2%.

12. The sintered material according to claim 1, including calcium and in which a percentages by weight of calcium is in a range of 0.05% to 1.2%.

13. The sintered material according to claim 12, in which the silicon nitride ($Si_3N_4$) in the beta form represents, as a percentage by weight, at least 80% of the whole of the silicon nitride ($Si_3N_4$) in the beta form and in the alpha form.

14. The sintered material according to claim 12, in which the amount of $Si_2ON_2$, as a percentage by weight, is less than 5%.

15. The sintered material according to claim 14, in which the $Si_3N_4$/SiC weight ratio is in the range 0.1 to 0.2.

16. The sintered material according to claim 15, in which the silicon nitride ($Si_3N_4$) in the beta form represents, as a percentage by weight, at least 80% of the whole of the silicon nitride ($Si_3N_4$) in the beta form and in the alpha form.

17. The sintered material according to claim 1, including at least 0.3% by weight of boron, as a percentage by weight.

18. A sintered material sintered between 1100° C. and 1700° C. based on silicon carbide (SiC) with a silicon nitride binder ($Si_3N_4$), said sintered material including a boron compound selected from the group consisting of oxides, carbides, nitrides, fluorides containing boron and $CaB_6$, and optionally including a calcium compound, a total amount of calcium and boron being in a range of 0.05% to 1.5%, a $Si_3N_4/SiC$ weight ratio being in a range 0.1 to 0.2, a porosity of the sintered material being 10% or more.

19. A refractory product in the form of a shaped or unshaped product comprising a sintered material according to claim 1.

20. The refractory product according to claim 19, wherein said shaped product is chosen in the group consisting of a block of an electrolysis cell; kiln furniture or other firing supports; a block, a tile and a tube of an heat exchanger; a block, a tile and a tube of a heat recuperator; a block, a tile and a tube of a heat regenerator; a block and a tube of a muffle; a block, a tile and a tube of a domestic incineration furnace; a block, a tile and a tube of a furnace of a glass making factory; a block, a tile and a tube of a metallurgical furnace; a block, a tile and a tube of a protection wall; a block of a skid rail of a metallurgical furnace; a block and a tube of an immersion heater; a heater tube; a thermocouple protective tube; and a tube for transporting molten metal.

21. The refractory product according to claim 20, wherein said shaped product is chosen in the group consisting of a plate; a post; a setter; a beam; a roller; a block, a tile or a tube of a furnace of a glass making factory in a location where it is not in direct contact with molten glass; a block, a tile or a tube of a holding furnace; a block, a tile or a tube of a smelting furnace for non ferrous metals; a block, a tile or a tube of a protection wall; a block of a skid rail of a furnace for the heat treatment of iron or steel bars or of other metallurgical products.

22. The refractory product according to claim 19, presenting a thickness less than 1/10 of its length and/or of its width.

23. The refractory product according to claim 22, presenting a thickness less than 2/100 of its length and/or of its width.

24. The refractory product according to claim 19, presenting a thickness less than 10 mm.

25. A fabrication method to fabricate a sintered material based on silicon carbide, with a silicon nitride binder, said method comprising the following steps in succession:
A) preparing a charge comprising a particulate mixture comprising a silicon carbide granulate, silicon, at least one boron compound, and optionally at least one calcium compound, the boron compound being selected from the group consisting of oxides, carbides, nitrides, fluorides containing boron and $CaB_6$, and a binder optionally being added to said particulate mixture;
B) forming said charge; and
C) firing said formed charge in a reducing atmosphere of nitrogen at a temperature in the range 1,100° C. to 1,700° C.;
said boron and/or calcium compound being added in a quantity which is determined so that the sintered material obtained at the end of step C) includes a total amount of calcium and boron in the range 0.05% to 1.5%.

26. The fabrication method according to claim 25, in which step B) comprises the following operations:
i) forming the charge by pressing or by casting or slip casting in a porous or non porous mold, to obtain a preform;
ii) unmolding said preform; and
iii) drying.

27. The fabrication method according to the claim 25, in which said boron compound is selected from the group consisting of $B_4C$, $CaB_6$, $H_3BO_3$, and BN.

28. fabrication method according to claim 27, in which said boron compound is selected from the group consisting of $B_4C$ and $CaB_6$.

29. The fabrication method according to claim 28, in which said boron and/or calcium compound is $CaB_6$.

30. The fabrication method according to claim 25, in which said boron and/or calcium compound is free of oxygen.

31. The fabrication method according to claim 25, in which said calcium compound is selected from the group consisting of oxides, carbides, nitrides, fluorides, and metal alloys containing calcium.

32. The fabrication method according to claim 25, in which said boron and/or calcium compound is added in a quantity which is determined so as to obtain a refractory product comprising a sintered material including 0.05% to 1.5% of boron, the $Si_3N_4/SiC$ weight ratio being in the range 0.05 to 0.45.

33. The fabrication method according to claim 25, comprising, after step C), a second firing step wherein the refractory product obtained at the end of step C) is fired in an oxidizing atmosphere at a temperature between 1,000° C. and 1,700° C.

34. A fabrication method comprising:
a) placing an item on a firing support comprising a sintered material according to claim 1 and being free of any coating, at least on the surface in contact with said item; and
b) firing said item.

\* \* \* \* \*